United States Patent [19]

Schwendeman

[11] Patent Number: 5,396,537
[45] Date of Patent: Mar. 7, 1995

[54] RELIABLE MESSAGE DELIVERY SYSTEM
[75] Inventor: Robert J. Schwendeman, Pompano Beach, Fla.
[73] Assignee: Motorola, Inc., Schaumburg, Ill.
[21] Appl. No.: 963,370
[22] Filed: Oct. 19, 1992

Related U.S. Application Data

[63] Continuation-in-part of Ser. No. 954,106, Sep. 30, 1992, Pat. No. 5,315,635.

[51] Int. Cl.⁶ .......................................... H04M 11/00
[52] U.S. Cl. ..................................... 379/57; 379/58; 340/825.44
[58] Field of Search ...................... 379/56, 57, 58, 93, 379/97, 98, 99; 340/825.44, 311.1, 825.07, 825.15, 825.17; 370/94.1; 358/437, 439, 441

[56] References Cited

U.S. PATENT DOCUMENTS

| | | | |
|---|---|---|---|
| 4,644,351 | 2/1987 | Zabarsky et al. | 379/57 X |
| 4,803,487 | 2/1989 | Williard et al. | |
| 4,875,038 | 10/1989 | Siwiak et al. | |
| 4,882,579 | 11/1989 | Siwiak . | |
| 4,914,649 | 4/1990 | Schwendeman et al. | |
| 4,918,437 | 4/1990 | Jusinski et al. | |
| 4,952,929 | 8/1990 | DeLuca et al. | |
| 4,991,197 | 2/1991 | Morris | 379/58 |
| 5,043,721 | 8/1991 | May . | |
| 5,051,992 | 9/1991 | DeLuca et al. | |
| 5,138,311 | 8/1992 | Weinberg . | |
| 5,151,899 | 9/1992 | Thomas et al. | 370/94.1 |
| 5,315,635 | 5/1994 | Kane et al. | 379/57 |

OTHER PUBLICATIONS

EMBARC Advanced Messaging by Motorola, Brochure No. RC-5-60 Sep. 1992.

*Primary Examiner*—Curtis Kuntz
*Assistant Examiner*—G. J. Oehling
*Attorney, Agent, or Firm*—Kelly A. Gardner; John H. Moore

[57] ABSTRACT

A method and apparatus for reliably delivering messages (200) from a central terminal (102) to a communication receiver (130) in a communication system (100), such as an electronic mail system. The central terminal (102) transmits messages (1300) to the communication receiver (130) and the communication receiver (130) receives transmitted messages (1300) over a first communication medium (122). The communication receiver (130) reconciles messages that it failed to receive over the first communication medium (122) with the central terminal (102) over a second communication medium (152). The reconciliation process between the communication receiver (130) and the central terminal (102) utilizes cyclic redundancy codes (CRCs) transmitted with the messages (1300) to identify the messages (1300) being reconciled.

12 Claims, 11 Drawing Sheets

1

RELIABLE MESSAGE DELIVERY SYSTEM

This is a continuation-in-part of U.S. patent application Ser. No. 07/954,106, now U.S. Pat. No. 5,315,635, filed Sep. 30, 1992 by Kane et al., entitled "Reliable Message Communication System".

FIELD OF THE INVENTION

This invention relates generally to message delivery systems, such as for electronic mail systems, and more specifically to a method and apparatus for reliably delivering messages to one or more remote units from a central communication system utilizing a paging transmitter system.

BACKGROUND OF THE INVENTION

Communication systems, such as paging systems, typically communicate messages from an originating device to one or more destination devices. These messages can include numeric and alphanumeric information for a user of the destination device. The destination device, e.g., a selective call receiver or pager, typically presents the information received to the user by displaying the information on a display.

Contemporary paging systems offer a limited message length for communicating information. For example, an alphanumeric message may be typically 80 1 characters or less. These typical message lengths have provided reasonably reliable delivery Of messages to the users of the communication system.

On the other hand, a distinct trend in the market is for customers desiring much longer messages, such as from ten to one hundred times longer messages or more. Transmission of these messages over a paging channel can encounter a number of obstacles to reliable delivery of the longer messages, such as different types of interference, fading, noise, and other phenomena detracting from error-free and reliable communication of the messages to the destination devices.

This difficulty in reliable transmission of the longer messages is especially frustrating to customers that are used to communicating long messages over a more reliable communication medium, such as direct wire line or dial-up telephone communication. This:is particularly the case for electronic mail system users which typically desire to send relatively long messages with a high degree of certainty that the messages are received error free. Typically, an originating device, such as a personal computer or workstation, can send long messages to one or more destination devices, such as other personal computers or workstations, over a direct wire line interface, or over a local area network (LAN), or over a dial-up telephone line connection using the public switched telephone network (PSTN).

Therefore, a need exists to enhance the reliability of transmitting messages, including long messages, in communication systems that utilize paging systems for delivering the messages.

SUMMARY OF THE INVENTION

According to an embodiment of the present invention, there is provided a method and apparatus for reliably delivering messages to a communication receiver in a communication system. The communication system transmits messages to the communication receiver and the communication receiver receives transmitted messages over a first communication medium. The communication receiver reconciles messages that it failed to receive, e.g., missed messages and erroneously received messages, over the first communication medium with the communication system over a second communication medium. The reconciliation process between the communication receiver and the communication system utilizes message identifiers transmitted with the messages to identify the messages being reconciled.

DESCRIPTION OF A PREFERRED EMBODIMENT

Figure 1:
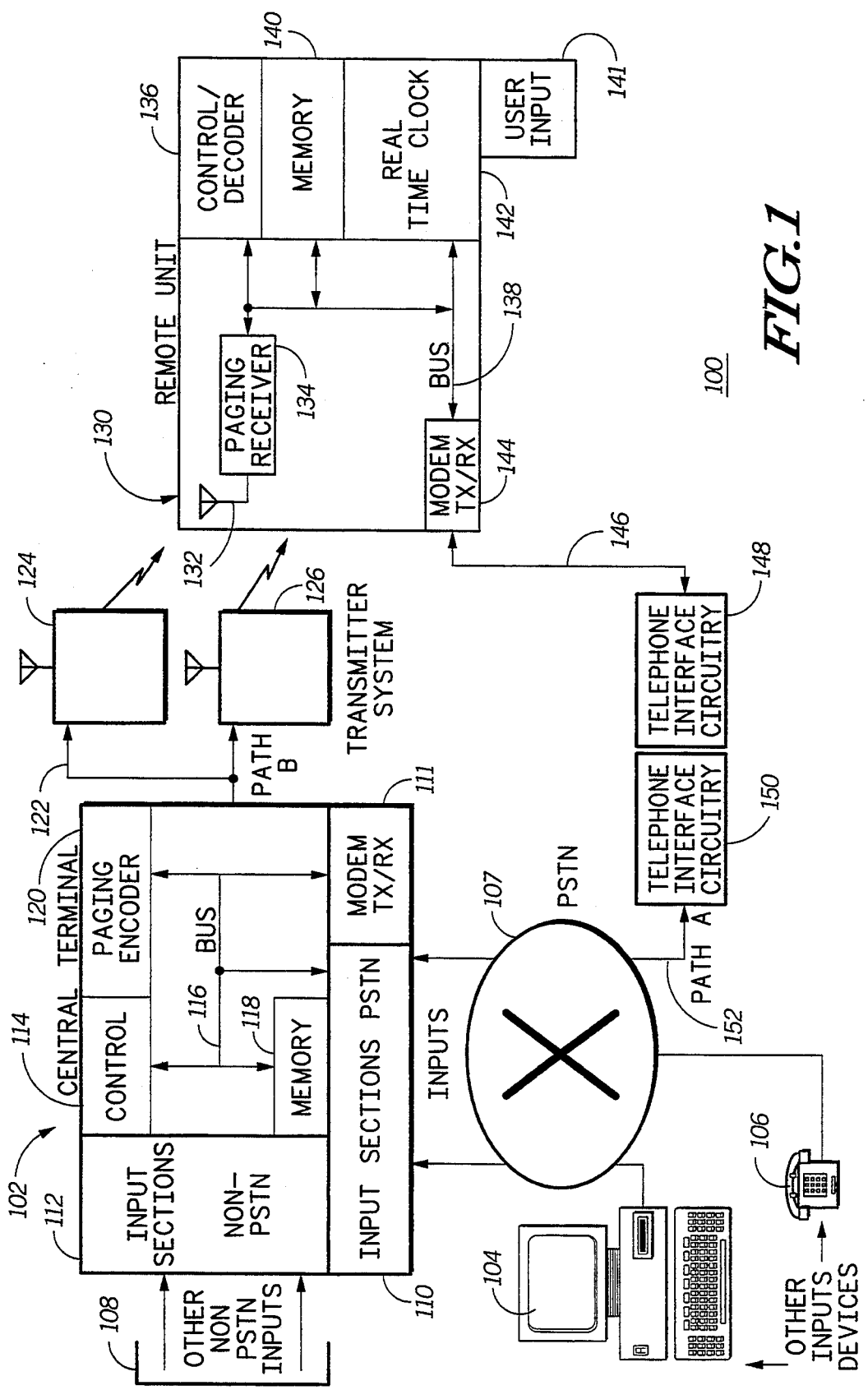
FIG. 1 is a block diagram of a communication system in accordance with the preferred embodiment of the present invention.

FIG. 1 shows a communication system 100 utilizing a paging transmitter system 120, 122, 124, 126, for delivering messages to at least one portable remote unit, e.g., a portable selective call receiver 130, in accordance with the preferred embodiment of the present invention. A central terminal 102 comprises input sections 110, 112 for receiving inputs from a number of different devices 104, 106, 108, including receiving page requests for initiating pages that are transmitted by the paging transmitter system 120, 122, 124, 126, to the at least one portable remote unit 130. The central terminal 102 has input sections 110 that interface with the telephone company equipment, such as the public switched telephone network (PSTN) 107. Personal computers or other computing devices 104 can access the input sections 110 through the PSTN using a dial-up telephone line and modem communication. Other calling devices, such as telephone input devices 106 can access the input sections 110 of the central terminal 102 through the PSTN 107. Typically, these input devices 104, 106, can remotely initiate page requests through the central terminal 102 by calling up the input sections 110 of the central terminal 102 over dial-up telephone lines of the PSTN 107.

Alternatively, other input sections 112 of the central terminal 102 can receive inputs, such as page requests, from local computing devices 108, such as a local personal computer or console or other terminal device. Typically, the one or more local input devices 108 interface with the input sections 112 of the central terminal 102 via direct wire line connections using standard RS-232 or RS-422 interface.

The input sections 110, 112, communicate page requests to a controller 114 through a communication bus 116. The controller 114 may comprise controller circuitry and associated memory such that an incoming page request may be accepted and stored into available memory for subsequent transmission to one or more selective call receivers 130. Additionally, a non-volatile memory device 118, such as battery backed up RAM, one or more disc drive units, or other non-volatile storage medium, is utilized by the controller 114 for longer term storage of messages destined for the one or more selective call receivers 103. The controller 114 typically couples the message information and other associated information to the memory device 118 via the bus 116. The message information, which can include numeric, alphanumeric, or binary information, and other associated information stored in the memory 118 can be used by the controller 114 for reliable delivery of the message to the destination or remote unit 130, as will be more fully discussed below.

The controller 114 couples messages to the paging encoder 120 over the bus 116 for encoding the messages for transmission over a paging channel. The paging encoder 120 then couples the encoded messages over a communication path 122' to one or more paging transmitter systems 124, 126, for transmission over a paging communication channel. The communication path 122, in this example, will be labeled path B which routes the messages from the central terminal 102 to a paging transmitter system 124, for transmission and over a paging communication channel for reception by the one or more selective call receivers 130. The general operation of a communication system including a paging system of the type shown in FIG. 1 is more fully described in U.S. Pat. No. 5,138,311, issued Aug. 11, 1992, entitled, "Communication System Having adaptable Message Information Formats", which is assigned to the same assignee as the present invention and is incorporated herein by reference.

The selective call receiver 130 preferably incorporates a paging receiver 134 that operates to receive messages transmitted over the paging communication channel through the antenna 132. The operation of a paging receiver 134 of the general type shown in FIG. 1 is well known and is more fully described in U.S. Pat. No. 4,518,961 issued May 21, 1985, entitled, "Universal Paging Device With Power Conservation", which is assigned to the same assignee as the present invention and is incorporated herein by reference.

The paging receiver 134 couples a received message to the controller 136 through the bus 138. The controller 136 address information in the received message and then match predetermined address in the selective call receiver 130. In this way, the controller 136 can determine whether the received message is intended for the particular selective call receiver 130. Further, a memory 140 is coupled to the paging receiver 134 and the controller 136 through the bus 138 for storing the received message in the memory 140. A user can access user input means 141, such as buttons or switches, at the remote unit 130 to cause the message data of a received message to be displayed on a display, e.g., a liquid crystal display (not shown). The user can then read the message that is visible on the display. User input at the remote unit 130 can also cause the remote unit 130 to perform other functions that are well known to users of selective call receivers and portable personal computing devices.

A real time clock 142 is also coupled through the bus 138 to the controller 136 for providing time information thereto. The remote unit 130 is then capable providing time information to the user by displaying the time information on the display (not shown). Additionally, the controller 136 can utilize the, time information provided by the real time clock 142 to keep track of the time when messages were received at the remote unit 130 and to perform and other useful operations that will be more fully discussed below.

Furthermore, the selective call receiver 130 includes a modem transmitting unit and a modem receiving unit 144 and the associated telephone interfacing circuitry or other suitable communications apparatus (e.g., packet radio modem) which allows the user of the selective call receiver 130 to connect the selective call receiver to a telephone interface 150, such as may be provided by an RJ11 plug 148 and associated wiring 146 at the selective call receiver 130 and the complimentary wall jack 150 and associated wiring 152 thereof. This telephone interface 144, 146, 148, 150, 152, allows the controller 136 of the selective call receiver 130 to remotely access the central terminal 102 through a dial-up telephone line and the PSTN 107. At the central terminal 102, a modem transmitting unit and a modem receiving unit 111 is capable of communicating with the modem 144 at the selective call receiver 130. In this way, the selective call receiver 130 can communicate with the central terminal 102 and receive message information therefrom through a separate communication path which, in this example, is labeled path A 152. Therefore, the selective call receiver 130 cab receive message information from the central terminal 102 via path A 152 and via path B 122. The path A 152 communication medium and the path B 122 communication medium can comprise any communication paths, such as direct wired line path, telephone line path, or wireless communication path including at least one radio communication channel preferably path A 152 is different than path B 122.

In the preferred embodiment, path A 152 is a dial-up telephone line using modem communication between the central terminal 102 and the remote unit 130. Also, preferably path B includes a paging communication channel for transmitting messages to the selective call receiver 130. Alternatively, path A may be a one-way or two-way radio frequency communication channel between the remote unit 130 and the central terminal 102, and path B can be a paging communication channel. Additionally, in another alternative, path A and path B can be one-way or two-way radio frequency communication channels. An advantage of delivering messages to the remote unit 130 through the paging communication channel Over the two-way radio frequency communication channel is that typically more messages can be delivered through the medium in the paging communication channel. This in turn enhances the commercial viability of the communication system. However, using two-way radio frequency communication channels for both path A and path B may be perfectly acceptable in some systems.

By using a dial up telephone line interface for path A 152, and utilizing modem communication between the remote unit 130 and the central terminal 102 in the preferred embodiment, the reliability of transferring messages between the central terminal 102 and the remote unit 130 is relatively high and approaches the reliability that users of conventional computing systems have previously experienced. Hence, it is advantageous to transfer messages over the dial-up telephone line interface 152 because it is a more reliable communication medium than transmission over the paging communication channel 122, e.g., over a radio paging channel. On the other hand, the dial-up telephone line interface 152 has several draw backs. First, dial-up telephone line interfacing typically interfaces between one originating and one receiving device which significantly reduces the number of remote units that can subscribe to any type of communication system. Second, the telephone line interface 152 normally requires that the remote unit 130 connect to a telephone line interface which may not always be available. Third, the remote unit is not as portable due to the requirement that it be interconnected with the telephone interface. In the case of a paging communication channel transmission, the remote unit 130 is portable and can receive messages transmitted over the paging communication channel while the remote unit 130 is being carried by a user. Hence, although the telephone line interface communication tends to be more reliable than the paging channel communication, it can significantly limit the number of subscribing remote units 130 in the communication system, and it tends to inconvenience users by requiring them to connect their remote units 130 to a telephone line interface 152 for communication with the central terminal 102. Therefore, the preferred embodiment of the present invention utilizes both path A and path B communication of messages in a manner that significantly increases the reliability of transmission of messages between the central terminal 102 and the remote units 130 while allowing large numbers of portable remote units 130 to be serviced in the communication system, as will be more fully discussed below.

The communication system 100 of the preferred embodiment of the present invention allows high throughput of messages between the central terminal 102 and the portable remote units 130 by transmitting messages over the path B 122, e.g., a radio frequency paging channel, for normal communication of new messages between the central terminal 102 and the remote units 130. Additionally, for a higher grade of service, the central terminal 102 can transmit messages multiple tinges over path B 122 to better guarantee that the remote unit 130 will receive at least one of the transmissions of the same message. For example, the central terminal 102 can transmit a message three separate times over the paging channel 122 where each subsequent transmission of the same message is delayed by a predetermined time interval from the previous transmission, e.g., three minutes. In this way, the remote unit 130 has a higher probability of receiving the message transmitted over the paging channel 122.

Nonetheless, there may be times when the message is not received by the remote unit 130. In such event the communication system 100 provides a means at the remote unit 130 for determining that a message was missed and further for reconciling with the central terminal 102 to receive at least the message information of a missed message over a more reliable communication medium, such as provided through path A 152. However, the required throughput of path A 152 can be much lower than the throughput of messages through path B 122 because the number of missed messages will be much lower than the number of new transmitted messages for the communication system 100. Hence, the bulk of communication transmission including the transmission of new messages can be handled through path B 122, e.g., the radio frequency paging channel. The reconciliation of missed messages between the remote units 130 and the central terminal 102 can be handled over the more reliable communication medium provided through path A 152. Further the portable remote units 130 can be carried by a user while receiving new message transmissions over the paging channel 122. The users of the remote units 130 will be minimally inconvenienced by requiring that the remote unit 130 be connected with the telephone line interface 152 to perform reconciliation of missed messages because messages typically will be missed relatively infrequently. Optionally, as mentioned earlier, path A 152 can be configured as a one-way or two-way radio frequency communication channel between the central terminal 102 and the remote units 130. In this case, the message reconciliation can be performed while the users carry the remote selective call receivers 130 such that. Hence, the users are minimally inconvenienced.

Figure 2:
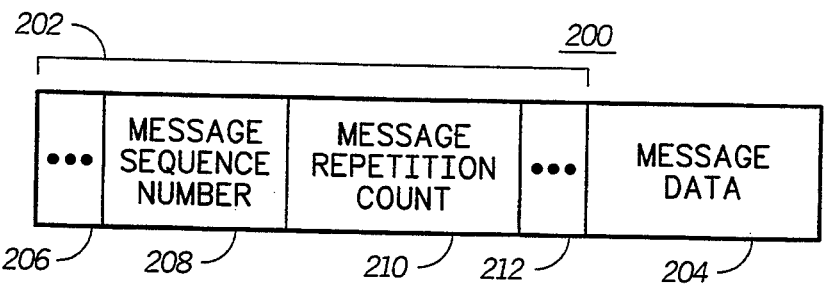
FIG. 2 is a message block diagram illustrating a transmitted message according to the preferred embodiment of the present invention.

FIG. 2 is a message block diagram illustrating a transmitted message according to the preferred embodiment of the present invention. The transmitted message 200 typically includes identification and control information 202, as well as message data information 204. The message data 204 normally is the information that is communicated between an originating party and the destination remote unit 130. That is, the message data 204 is the message information communicated to the user of the selective call receiver 130. The message data 204 can include numeric information, alphanumeric information, and binary data. The identification and control information 202 included with the message 200 normally is required for delivering the message in the communication system 100. Such information 202 includes address information 206 which identifies one or more remote units 130 as the destination of that message data 204. Hence, when a remote unit 130 receives a message 200 that was transmitted from the central terminal 102, the remote unit 130 can determine whether that particular message 200 was intended for reception by the particular remote unit 130. Normally, the address information 206 included with the message 200 is decoded by the remote unit 130 and compared to a predetermined address in the remote unit 130. If the address information 206 in the message 200 matches the predetermined address in the remote unit 130 then the message 200 was intended for that particular remote unit 130. The remote unit 130 can then store the received message data 204 in a memory 140 in the remote unit 130, or optionally in a computer memory of a computing device associated with the remote unit 130 for later processing. A user of the remote unit 130 can subsequently review the message data 204 to communicate the message to the user. Typically, the user reviews the message on a display on the remote unit 130. That is, for example, the user can read the message on a display screen such as commonly available on portable personal computers and portable selective call display receivers.

Additionally, in the preferred embodiment of the present invention, the message 200 includes other identification information fox enhancing the reliability of delivering the message from the central terminal 102 to the portable selective call receiver 130. For example, each message 200 can include a message sequence number 208 which identifies the relative sequence of the message 200 in a transmission sequence for messages transmitted from the central terminal 102 to the remote unit 130 for a particular address information 206. That is, each message that includes the same address information 206, i.e., that is destined for reception by the same one or more remote units 130, can be tagged with a message sequence number 208 that identifies to the one or more remote units 130 when a transmitted message 200 is received out of sequence or when a transmitted message was not received by the remote unit 130.

When a transmitted message 200 is received by the remote unit 130 and the address information 206 in the message 200 matches a predetermined address for the remote unit 130, then, if the message sequence number 208 identifies the message 200 as being out of sequence with a transmission sequence established by previously received messages, the remote unit 130 may determine that one or more messages were transmitted by the central terminal 102 and not received by the remote unit 130. Those transmitted messages that intervened between the last received message in the transmission sequence and the received message being out of sequence may have been missed by the remote unit 130. However, the intervening messages may not always have been missed.

For example, the communication system 100, as discussed earlier, can transmit messages multiple times over the paging communication channel 122 to provide a higher grade of service for the destination remote units 130. In this case a message 200 can be received by the remote unit 130 and the message sequence number 208 may indicate that the received message 200 is out of sequence with a transmission sequence established by previously received messages at the remote unit 130. However, this may only indicate that one transmission of a message was missed by the remote unit 130 and that subsequent re-transmissions of that message may be received by the remote unit 130, thereby reestablishing the transmission sequence of received messages at the remote unit 130.

Preferably, a message repetition count 210 is included with each transmitted message 200 to identify to a receiving remote unit 130 the relative position of the received message 200 in a repetition sequence. For example if under a grade of service, messages are repeatedly transmitted three times for delivery to a receiving remote unit 130, where the repeatedly transmitted messages have the same destination address 206, a received message 200 including a message repetition count 210 of two may identify to the receiving remote unit 130 that the received message 200 was the second transmission of that message from the central terminal 102.

Other information can be transmitted with a transmitted message 200, such as error detecting and/or correcting code. For example, a cyclic redundancy code (CRC) 212 can be included with each transmitted message 200 to help identify at the receiving remote unit 130 when received message data 204 has been erroneously received, e.g., when the message data 204 has been received with errors included therein. In this cage, although the message 200 has been received by the remote unit 130, the message data 204 may not ba completely and correctly communicated to the user of the remote unit 130. Hence, the remote unit 130 has failed to receive the message 200 accurately enough to communicate the message information to the user of the remote unit 130. Hence, two possible conditions can identify when the remote unit 130 has failed to receive a transmitted message. The first is when the remote unit receives a transmitted message out of sequence with a previously established transmission sequence. The second is when the remote unit 130 receives a transmitted message having errors in the message data 204. The CRC 212 can be used by the receiving remote unit 130 to determine when the received message includes errors in the received message data 204. Therefore, a receiving remote unit 130 has at least these two ways of affirmatively determining that a transmitted message was not received by the remote unit 130.

Figure 3:
FIG. 3 is a message sequence diagram illustrating a first example of received messages being stored in the memory of a remote unit of the communication system according to the preferred embodiment of the present invention.

FIG. 3 is a message sequence diagram illustrating messages being received by a remote unit 130 and being stored in memory 140 for identifying a transmission sequence as established by the previously received messages. For example, a transmitted message 200 included a message sequence number 208 can identify the received message 200 at the remote unit 130 as being the first received message in a transmission sequence. This is shown in FIG. 3 by the message block 302 including the number 1 to identify the message as the first in a transmission sequence. That message 302 was received by the remote unit 130 and stored in the memory 140. Subsequently, a second message 304 in the transmission sequence was received by the remote unit 130 and stored in memory 140. The remote unit 130 may store additional information with each message in memory 140 to identify the transmission sequence as shown. For example, the messages 302, 304, may be stored in a linked list data structure in memory 140. In this way, the controller 136 can keep track of a transmission sequence as identified by the previously received messages 302, 304. When a new message is received, such as shown by message number three 306 the controller 136 can couple the message 306 to the memory 140 and organize the message 306 into the link list of previously received messages 302, 304, for a particular address. The sequence is shown by the messages 308, 310, 312, organized into the link list.

Figure 4:
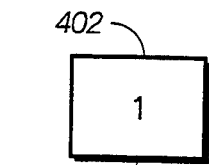
FIG. 4 is a message sequence diagram illustrating a second example of received messages being stored in the memory of a remote unit of the communication system according to the preferred embodiment of the present invention.
Figure 4:
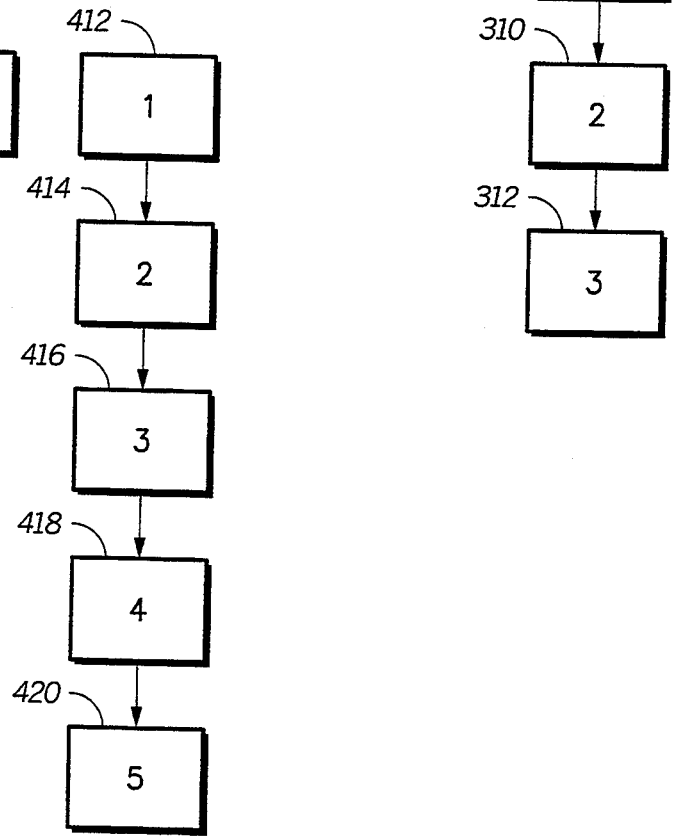

FIG. 4 illustrates a second example of received messages being stored in the memory 140. A linked list of messages 402, 404, 406, 408 can indicate to the remote unit 130 that received messages four 406 and five 408 were received out of sequence with a previously established transmission sequence. In other words, message three was missed by the remote unit 130. If the communication system 100 repeatedly transmits each transmitted message over the paging communication channel, then a subsequent transmission of message three 410 may be received by the remote unit 130. Consequently, the linked list of messages in memory 140 can be adjusted to reestablish a transmission sequence as indicated by previously received messages 412, 414, 416, 418, 420. In this example, messages four 406 and five 408 were received by the remote unit 130 between the time that a first transmission of message three was missed by the remote unit 130 and a second transmission of message three 410 was received by the remote unit 130. As mentioned earlier, re-transmissions of the same message can occur every several minutes to enhance the probability that the remote unit 130 will receive at least one of the transmissions. Of course, subsequent receptions of an already received message are simply ignored. In this way, the communication system 100 can enhance the reliability of delivering messages from the central terminal 102 to one or more remote units 130.

Additionally, when the communications system 100 re-transmits messages to the one or more remote units 130 to provide a higher grade of service, the remote unit 130 can delay a predetermined time interval after receiving the latest message in the transmission sequence before determining that any subsequently received messages were received out of sequence. That is, the remote unit 130 can delay a predetermined amount of time to avoid falsely indicating to a user of the remote unit 130 that a message was missed by the remote unit 130 during a time interval where the missed message may be re-transmitted by the central terminal 102 and received by the remote unit 130.

For example the remote unit 130 can delay ten minutes after receiving message number two 404, and if message number three is missed during that ten minute time interval while message numbers four and five 406, 408, are received during that ten minute time interval the remote unit 130 does not disturb the user by indicating that message number three was missed. If message number three 410 is also received during that ten minute time interval then the remote unit 130 can reestablish the transmission sequence as indicated by the linked lift of messages 412, 414, 416, 418, 420, that are stored in memory 140. Hence, in one mode of operation, after receiving a message that is determined to be in the transmission sequence established by previously received messages, the remote unit 130 can provide a time window, i.e., a predetermined time interval, where message repetition after a missed message may reestablish a transmission sequence as stored in the memory 140 of the remote unit 130. Further, the user is not bothered by unnecessary alerts indicating that a message was not received by the remote unit 130. This process can be handled automatically by the remote unit 130 relieving the user from having to keep track of the received message sequence.

Figure 5:
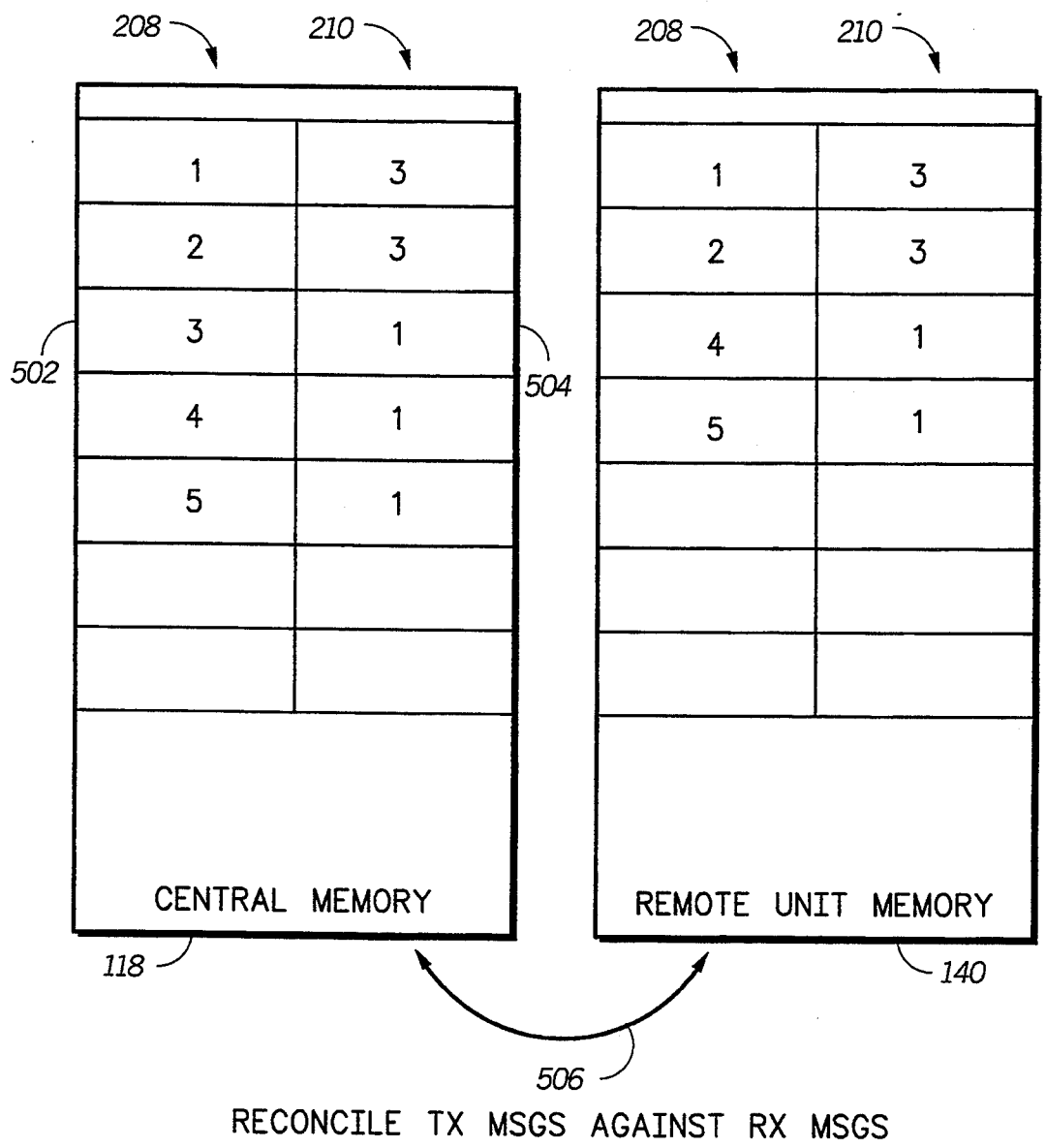
FIG. 5 is a block diagram illustrating messages stored in the memory of a central terminal of the communication system and messages stored in the memory of a remote unit before a reconciliation of messages between the central terminal and the remote unit, in accordance with the preferred embodiment of the present invention.

FIG. 5 is a block diagram illustrating a sequence of messages stored in the memory 118 of the central terminal 102 as the messages have been transmitted from the central terminal 102 to the remote unit 130. Further the memory 140 of the remote unit 130 is shown including the messages received by the remote unit 130. The messages can be stored in both memories 118, 140, to indicate a transmission sequence through the message sequence numbers 208, and to indicate a repetition sequence through the message repetition count 210.

Hence, the central terminal 102 and the remote unit 130 can individually keep track of a message transmission sequence. As shown, messages three, four and five were transmitted from the central terminal 102 but only messages four and five were received by the remote unit 130. The first transmission of message three as shown by the message sequence number 502 and the message repetition count 504 stored in the memory 118 of the central terminal 102 has been missed by the remote unit 130. The memory 140 of the remote unit 130 shows that messages one, two, four and five were received by the remote unit 130, where messages four and five were received out of sequence with the transmission sequence established by the previously received messages one and two. Hence, message three was missed by the remote unit 130. One way that message three can be reliably delivered to the remote unit 130 is through message repetition, as discussed earlier. Hence, the next time that message number three is transmitted to the remote unit 130 it may be received by the remote unit 130. A second way that message number three can be reliably delivered to the remote unit 130 is through message reconciliations. This is indicated by the arrow 506. In this case, the remote unit 130 communicates with the central terminal 102 via the path A 152 to deliver message number three to the remote unit 130. That is, the remote unit 130 and the central terminal 102 reconcile the transmitted messages against the received messages 506 and only those messages that were missed by the remote unit 130 need be transmitted over path A. Therefore, the message throughput over path A 152 can be kept to a minimum which reduces the amount of time spent communicating between the remote unit 130 and the central terminal 102 over path A 152 and consequently allows more remote units 130 to efficiently communicate with the central terminal 102 over path A 152 with the available resources of the central terminal 102. This is a significant advantage of the present invention. The reconciliation process 506 will be more fully discussed below.

Figure 6:
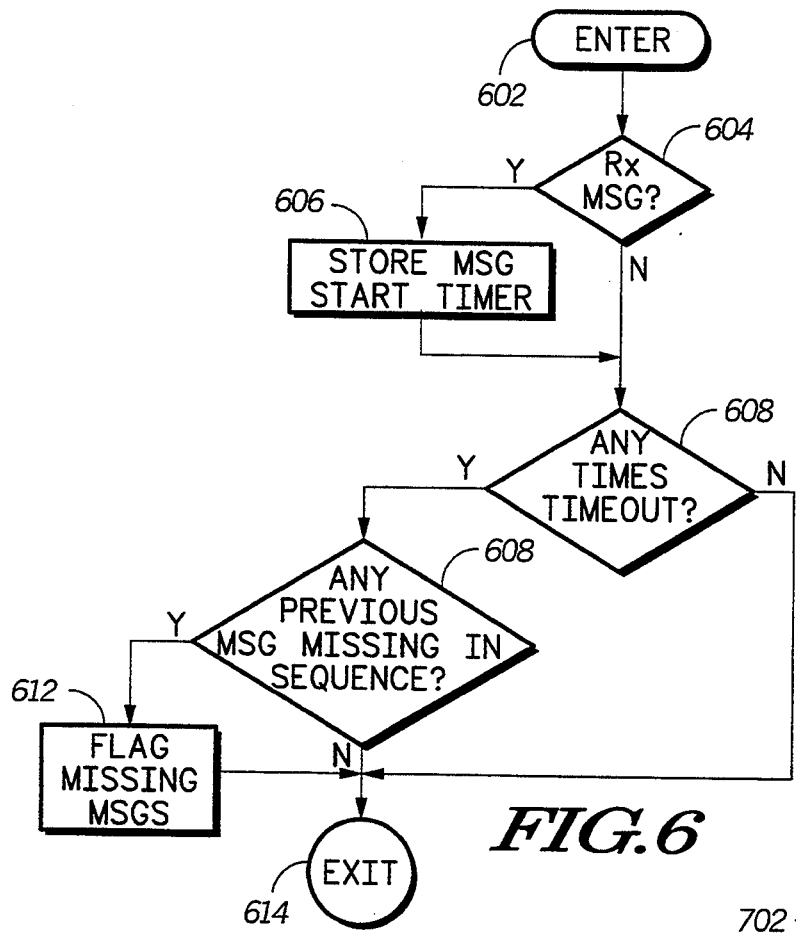
FIG. 6 is a flow diagram illustrating an operational sequence for a remote unit, according to the preferred embodiment of the present invention.

FIG. 6 is a flow diagram illustrating an operational sequence for the remote unit 130, according to the preferred embodiment of the present invention. A communication system 100 can optionally transmit messages multiple times to enhance the probability that at least one of the transmissions will be received by a portable unit 130 as discussed earlier. The portable unit 130, in this case, preferably delays a predetermined time from the last message received before determining that the received message is out of sequence with a transmission sequence previously established. One approach, as discussed earlier, was to delay a predetermined time interval after a received message was determined in sequence with the previously established transmission sequence. For example, a ten minute window would be allowed after the last received message in a transmission sequence for receiving other messages that may or may not be in sequence with the transmission sequence. After the ten minute delay the remote unit 130 would determine whether any received messages subsequent to the last received message in the transmission sequence were out of sequence and alert the user accordingly. In a second preferred approach, as illustrated in FIG. 6, the remote unit 130 delays a predetermined time interval, e.g., a ten minute time interval, after each received message before determining that the received message is out of sequence with the transmission sequence established by previously received messages.

That is the remote unit 130 delays for the predetermined time interval before determining that one or more messages may have been missed between the last received message and the previously established transmission sequence.

Specifically, FIG. 6 illustrates an operational sequence for the remote unit 130 which may be executed periodically in an event driven system. Every time that a message is received 602, 604 the remote unit 130 stores the message and starts a timer 606 to time a predetermined time interval after receiving the message. Each received message has associated a timer for timing out the respective time window after reception of the message. Each timer can be represented by a data structure in memory 140. If any timer times out 608 then the remote unit 130 reviews the linked list of messages in memory 140 to determine if any messages are missing with respect to the previously established transmission sequence 610. That is, the remote unit 130 for example, can traverse the linked list from the beginning to the point where the message having the timer has timed out to determine if there are any messages missing in the transmission sequence. Further, any missing messages would be flagged 612 to indicate the missed message condition. Optionally, at this time, the remote unit 130 can alert the user that a previously transmitted message was missed. The user can then couple the remote unit 190 to a telephone interface and utilize path A 152 communication with the central terminal 102 to reconcile and receive from the central terminal 102 at least the message data of a previously missed message.

Figure 7:
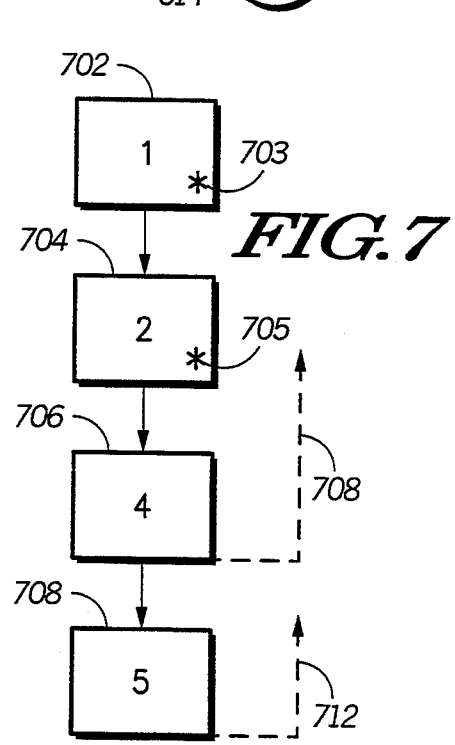
FIGS. 7 and 8 are message sequence diagrams illustrating a timing aspect of the second example of FIG. 4, in accordance with the preferred embodiment of the present invention.
Figure 8:
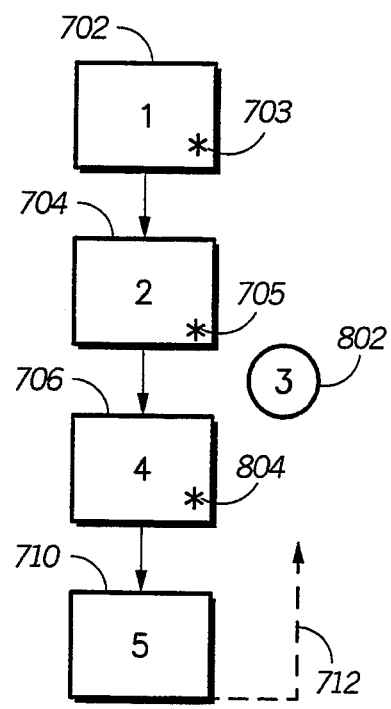

FIGS. 7 and 8 illustrate the preferred timing aspect as discussed above, using the message sequence of the second example illustrated in FIG. 4. As shown, the remote unit 130 receives messages 702, 704, 706, 710, and stores them in a linked list in memory 140 where the first two messages established a transmission sequence 703,705, and the subsequent two messages 706, 710, were received out of sequence with the previously established transmission sequence 703, 705. The subsequent two messages 706, 710 and have independent timers for each of the messages 708, 712 which time predetermined time intervals after reception of each of the messages, respectively, to determine if there were any missed messages between the transmission sequence 703, 705 and the subsequently received messages 706, 710.

FIG. 8 illustrates message three 802 having been received by the remote unit 130 and the timer for message four 706 having timed out a predetermined time interval. Consequently, the transmission sequence 702, 704, 706, spans to message four 804 as established by the received messages one 703, two 705, three 802, and four 804. Message five's timer 712 continues to time out its predetermined time interval before determining whether a message was missed prior to receiving message five 710. When message five's timer 712 eventually times out the transmission sequence will include all five received messages 702, 704, 706, 710.

Figure 9:
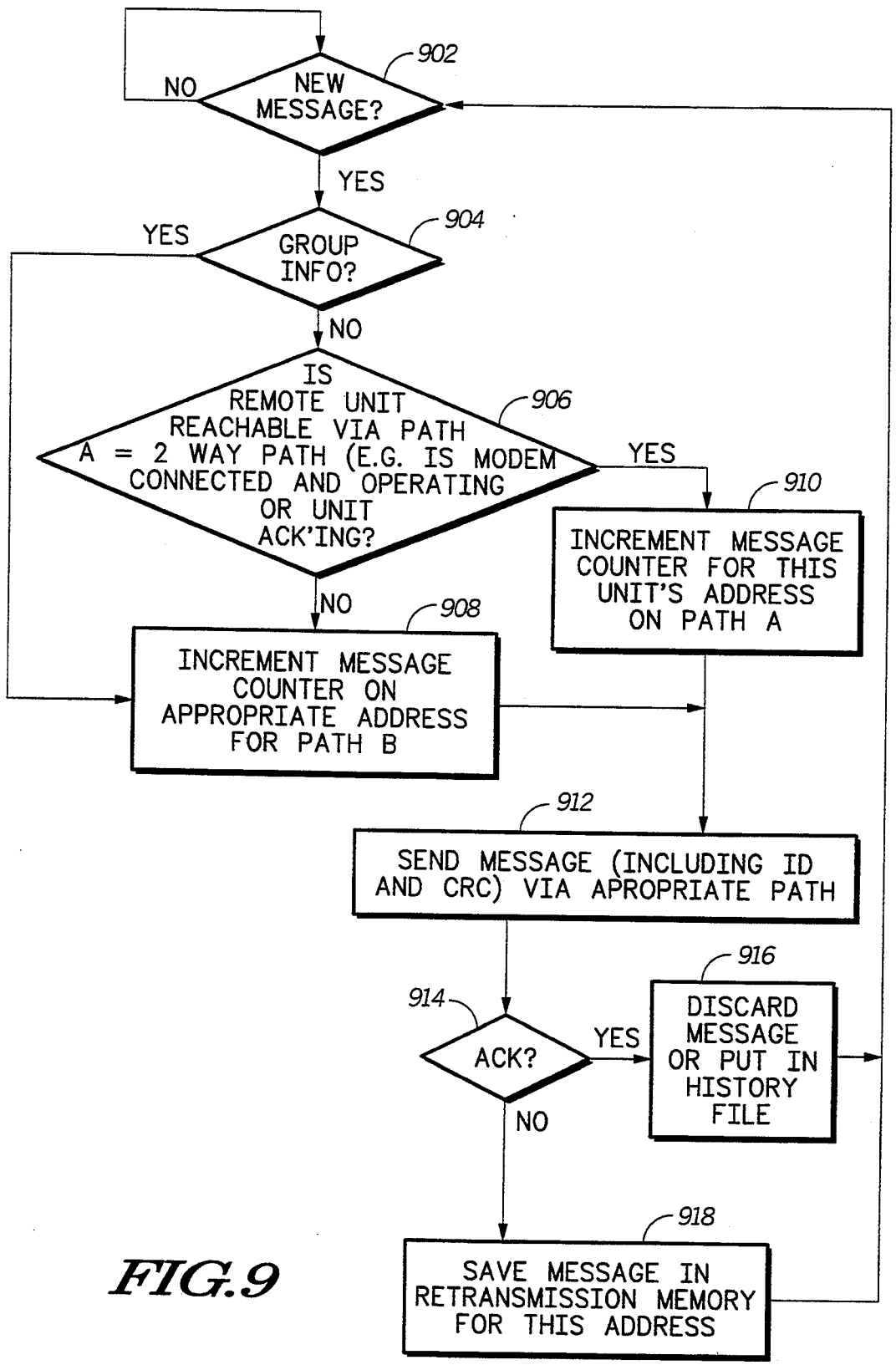
FIGS. 9 and 10 are flow diagrams illustrating operational sequences for the central terminal of FIG. 1, according to the preferred embodiment of the present invention.
Figure 10:
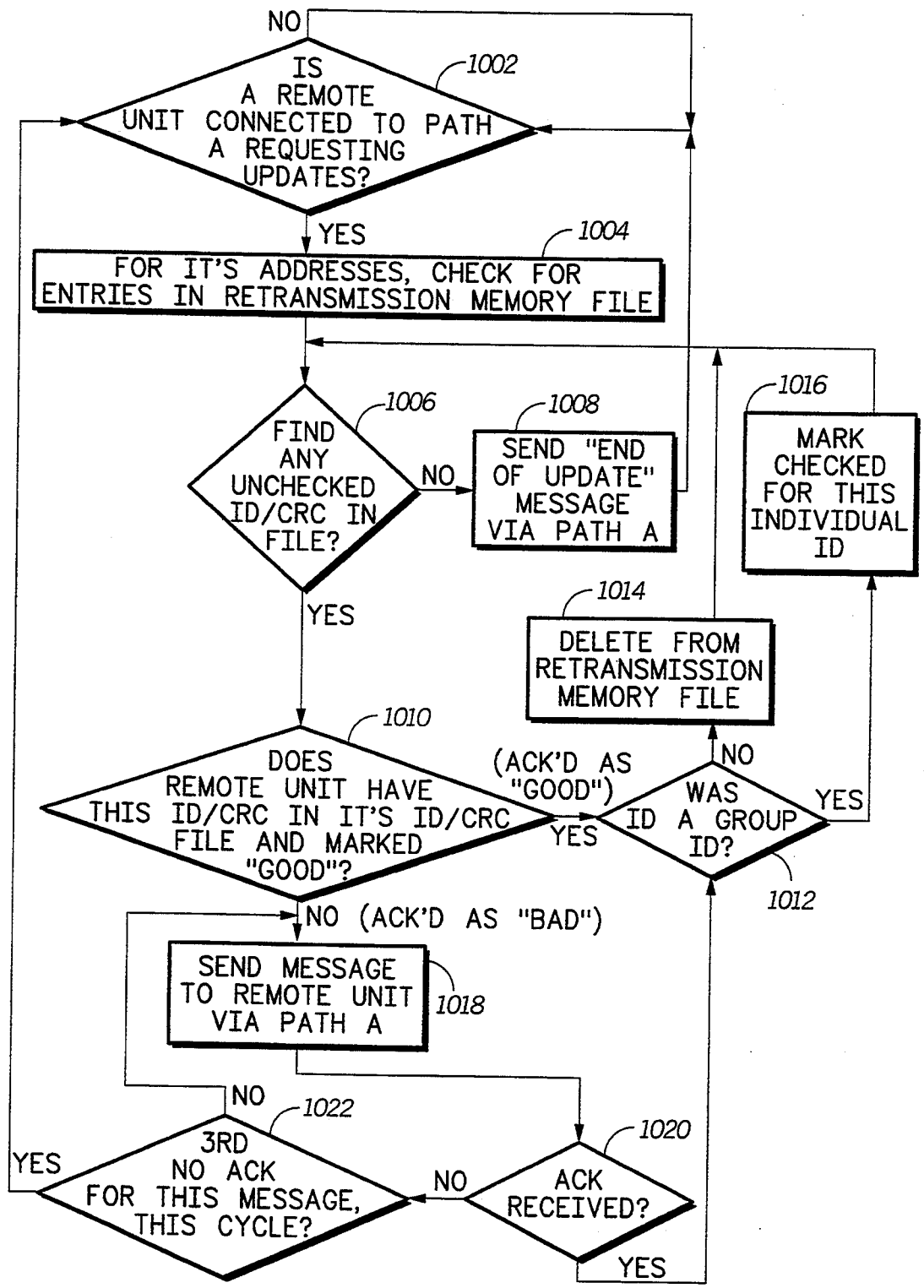

FIGS. 9 and 10 are flow diagrams illustrating operational sequences for the central terminal 102, according to the preferred embodiment of the present invention. As the central terminal 102 receives requests to transmit new messages 902 to one or more remote units 130, the central terminal 102 determines whether a transmission to a plurality remote units of 130 is requested, that is, whether the message is destined for a group 904 of remote units 130. If it is not, the central terminal 102 verifies 906 whether the remote unit 130 can be reached through the more reliable path A 152. This may be the case if the remote unit 130 is currently coupled to the central terminal 102 via path A 152 and can receive the message data through the more reliable communication medium. Another aspect of the reliable communication through path A 152 is that the remote unit 130 can acknowledge affirmative reception of the message data from the central unit 102, and hence the central terminal 102 optionally can re-transmit the message through path A 152 when the remote unit 130 failed to receive the message from the central terminal 102 over path A 152.

If the remote unit 130 is not reachable 906 through path A 152, then the central terminal 102 increments 908 the message counter for the address of the message for transmission through path B 122, and then sends 912 the message over path B 122. The message includes the message sequence identifier and the CRC code for error detection at the remote unit 130. The central unit 102 then determines 914 whether the remote unit 130 can and has acknowledged reception of the transmitted message. And in the case where the message is transmitted through path B 122, e.g., through the paging communication channel, no acknowledgment is expected by the central terminal 102, and the central terminal 102 then stores 918 the message in the memory 118.

When the central terminal 102 receives a request to transmit a message to a single remote unit 902, 904, 906, and the remote unit 130 is currently connected to the central terminal 102 through path A 152, then the central terminal 102 increments 910 the message counter for the address for transmission through path A 152 and sends 912 the message, including the message sequence identifier and the CRC, over the path A 152 using the more reliable communication medium. In this case, the remote unit 130 is expected to acknowledge 914 the reception of the transmitted message, and on so doing the central terminal 102 can optionally discard the message from memory 118 or save the message information in a history file 916 for future reference.

FIG. 10 illustrates the central terminal 102 operating in a reconciliation sequence with a remote unit 130 over path A 152 according to the preferred embodiment of the present invention. When the central terminal 102 detects 1002 that a remote unit 130 is connected to the central terminal 102 through path A 152, and the remote unit 130 is requesting a reconciliation operation then the central terminal 102 checks 1004 in the memory 118 for messages transmitted to the remote unit 130 including address information matching a predetermined address for the remote unit 130. The particular address, or addresses, to reconcile messages with the remote unit 130 can be identified in the request by the remote unit 130.

The central terminal 102 searches 1006 the messages in memory 118 that were transmitted to the remote unit 130 and not acknowledged by the remote unit 130 as having been received. Preferably, in the reconciliation request the remote unit 130 also identifies the messages that were received by the remote unit 130 since the last time the remote unit 130 requested reconciliation with the central terminal 102. Hence, the central terminal 102 verifies 1010 each of the messages identified in the reconciliation request, e.g., identified by the message sequence number, as having been transmitted by the central terminal 102 and received by the remote unit 130. If the transmitted message was a group message 1012 then the central terminal 102 flags the message in memory 140 as having been received by one remote unit 130 that is a member of a group.

Subsequently, the central terminal 102 continues searching 1006 for any other messages in memory 118 that were transmitted to the remote unit 130. If the identified message was not a member of a group 1012 then after a confirmation from the remote unit 130 the central terminal 102 can delete 1014 the message from the memory 118, or optionally store the message in a separate history file, and then continue searching 1006 for other messages in memory 118 that were transmitted to the remote unit 130. If the reconciliation request identifies that the remote unit 130 failed to receive a transmitted message, then the central terminal 102 transmits 1018 at least the message data of the missed message to the remote unit 130 through path A 152, and the central terminal 102 waits a predetermined time interval for an acknowledgment 1020 from the remote unit 130. Upon receiving an acknowledgment 1020, the central terminal 102 then determines whether the transmitted message was destined for a group 1012 of remote units 130, and, if it was, then the central terminal 102 flags 1016 the message in memory 118 as having been received by the individual remote unit 130, and continues searching 1006 for other messages in memory 118. On the other hand, if the transmitted message was not destined for a group 1012 then the central terminal 102 can delete 1014 the message from memory 118. Subsequently, the central terminal 102 continues searching 1006 for other messages in memory 118.

Optionally, if the central terminal 102 receives a negative acknowledgment 1022, or after a predetermined time interval after transmitting a message over path A, then the central terminal 102 checks if this is the third time 1022 that the message was not acknowledged by the remote unit 130 and re-transmits the message 1018 up until the third time of no acknowledgment 1020, 1022. On a third try 1022, the central terminal 102 terminates the current communication over path A and begins monitoring 1002 for a remote unit 130 requesting reconciliation over path A 152. In this way, the central terminal 102 can reliably deliver the message information to the, remote unit 130 over path A by repeatedly transmitting the message information until the central terminal 102 receives an affirmative acknowledgment from the remote unit 130.

As discussed earlier, path A 152 may include a one-way or two-way radio frequency communication channel for transmitting the message information to the remote unit 130 and receiving an affirmative acknowledgment over reception therefrom. This acknowledgment operation between a central terminal 102 and a remote unit 130 is more fully described in U.S. Pat. No. 4,918,437, issued Apr. 17, 1990, entitled "High Data Rate SimulCast Communication System", and in U.S. Pat. No. 4,882,579 issued Nov. 21 1989, entitled "Code Division multiplexed Acknowledge Back Paging System", and further in U.S. Pat. No. 4,875,038, issued Oct. 17, 1989, entitled "Frequency Division Multiplexed Acknowledge Back Paging System", all of which are assigned to the same assignee as the present invention and are incorporated herein by reference.

Figure 11:
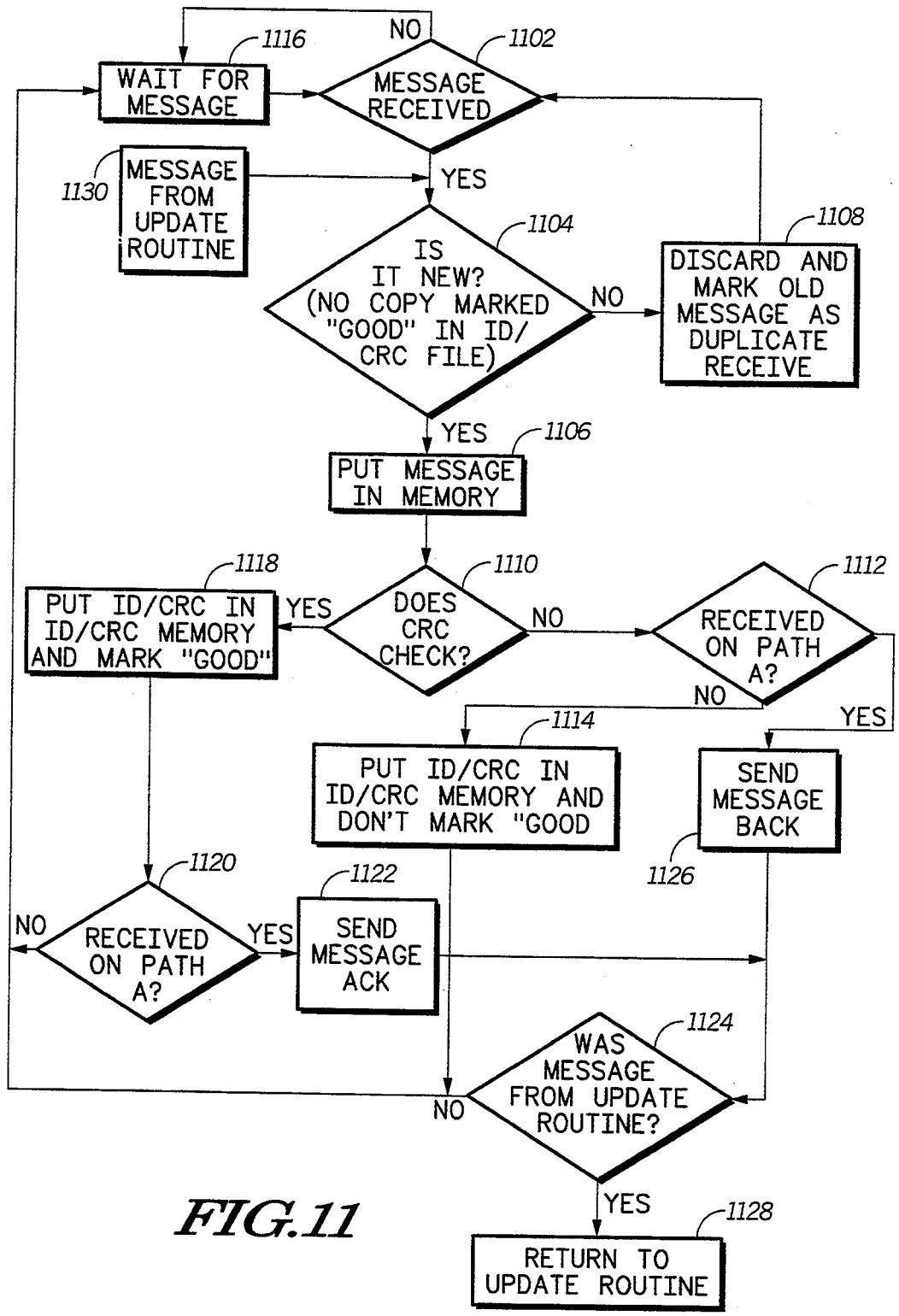
FIGS. 11 and 12 are flow diagrams illustrating operational sequences for the remote unit of FIG. 1, according to the preferred embodiment of the present invention.
Figure 12:
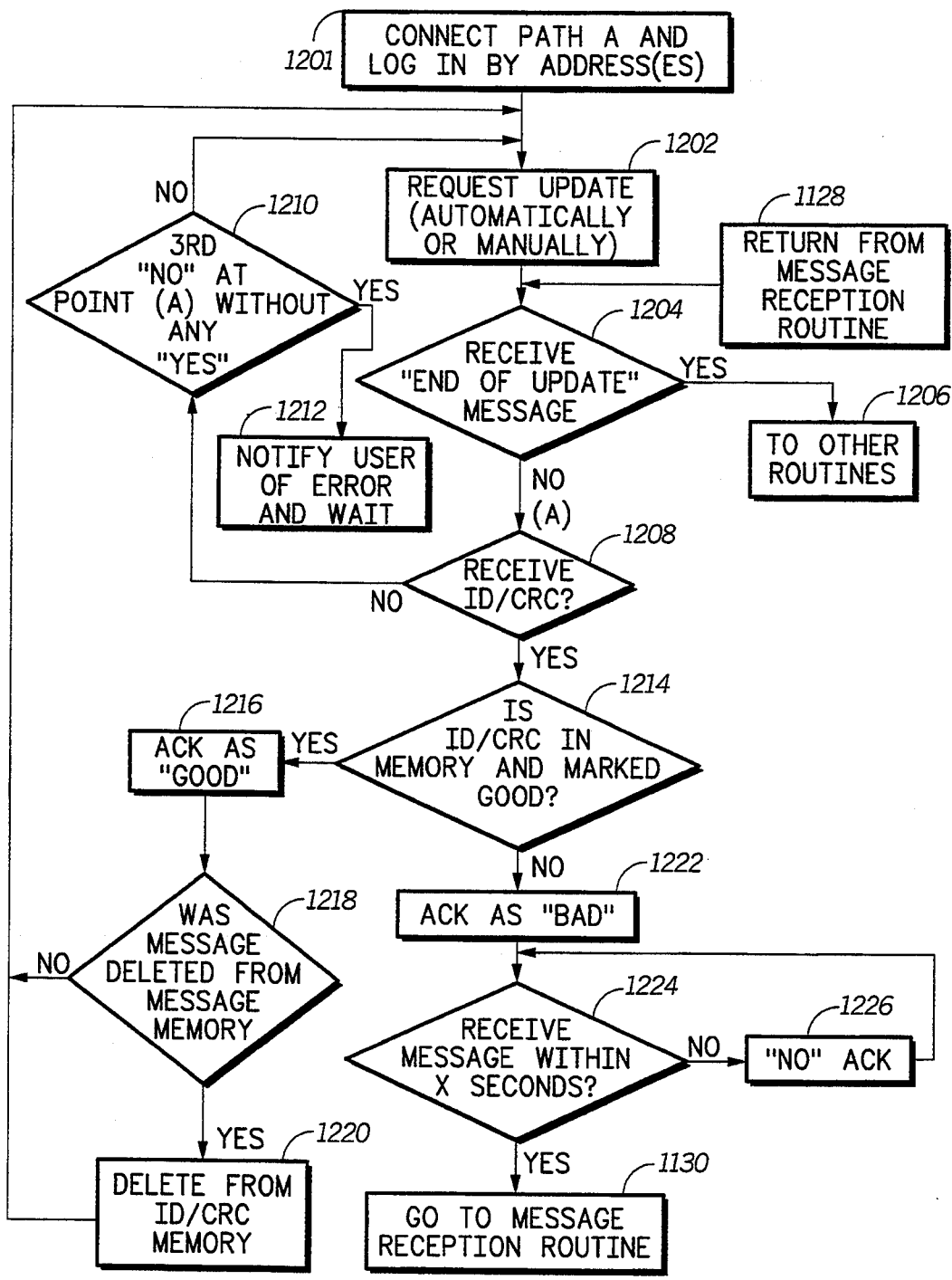

FIGS. 11 and 12 are flow diagrams illustrating operational sequences for the remote unit 130, according to the preferred embodiment of the present invention. FIG. 11 illustrates an exemplary message reception routine, and FIG. 12 illustrates an exemplary reconciliation handling routine or update routine. Typically, the remote unit 130 monitors 1102 whether a transmitted message was received by the remote unit 130 and waits 1116 for a message to be received. When a message is received 1102, the remote unit 130 checks 1104 if the message is a new message, and if not, then the remote unit 130 marks the message in memory 140 as having been a duplicate received message 1108. The remote unit 130 then may continue other operations while monitoring 1102 for other messages being received.

If a new message is received 1104 then the remote unit 130 stores 1106 the message in memory 140 and verifies 1110 that the message data contains no errors. This can be done by using the CRC transmitted with the message. If the, message was received with no errors in the message data 1110 then the remote unit 130 can flag 1118 the message, including the message sequence number and other identifying information, in memory 140. If the message was received over path B 1120, and not path A, then the remote unit 130 continues waiting 1116 and monitoring 1102 for messages being received. On the other hand, if the message was received 1120 over path A, than the remote unit 130 sends a message acknowledgment 1122 to the central terminal 102 over path A. Further if the message was received as part of a reconciliation sequence 124, then the remote unit continues the operational sequence in the reconciliation routine 1128. Otherwise, the remote unit 130, continues waiting 1116 and monitoring 1102 for other received messages.

If the message was received with errors 1110 in the message data then the remote Unit 130 determines whether the message was received over path A 1112. If received over path A 1112 then the remote unit 130 sends a negative acknowledgment message 1126 to the central terminal 102 to request re-transmission of the message. Subsequently, the remote unit may return to the reconciliation routine 1124, 1128 or may continue waiting 1116 and monitoring 1102 for other received messages. Alternatively, if the message with errors in the message data was received over path B 1112, and not path A, then the remote unit flags 1114 the message information in memory 140 as having been received incorrectly. Subsequently, the remote unit 130 continues waiting 1116 and monitoring 1102 for messages received. In this way, the remote unit 130 keeps in memory 140 an account of messages received in a transmission sequence, of messages received with errors in the message data, and of messages that were not received by the remote unit 130.

Referring to FIG. 12, once the remote unit 130 is connected 1201 and communicating with the central terminal 102 over path A 152, the remote unit 130 can initiate a reconciliation sequence 1202 with the central terminal 102. This can be done automatically between the remote unit 130 and the central terminal 102, or, optionally, in a response to a manual entry, e.g., in response to user input, at the remote unit 130 such as by buttons, or switches 141. While in the reconciliation handling routine 102, if the remote unit 130 receives a request from the central terminal 102 to terminate 1204 the reconciliation sequence, the remote unit 130 can exit the reconciliation handling routine and perform 1206 other functions. While in the reconciliation routine, the remote unit 130 waits to receive 1208 a transmission over path A from the central terminal. If the received message information 1208 is not correctly received by the remote unit 130, the remote unit 130 can request reconciliation again 1210, 1202. If the remove unit 130 requests reconciliation for a third time 1210 then it notifies 1212 the user that there is an error in communication with the central terminal 102.

In this example, as part of the response to the reconciliation request by the remote unit 130, the central terminal 102 can indicate the message sequence identifiers that the central terminal 102 is prepared to transmit to the remote unit 130. If the remote unit 130 determines 1214 that the message, as identified by the message sequence number indicated by the communication from the central terminal 102, was previously received by the remote unit 130, then the remote unit 130 can immediately transmit an acknowledgment 1216 to the central terminal 102 to let the central terminal 102 know that the message data does not have to be transmitted. Additionally, the remote unit 130 can determine 1280 if the message data was previously deleted from memory 140, such as after a user has read the message from a display. In this case, the remote unit 130 can also delete 1220 the message, message sequence number, and other associated information from memory 140 and then continue with the reconciliation request 1202.

If the remote unit 130 determines 1214 that a message was not received, or that the message data included errors, then the remote unit 130 can acknowledge 1222 to the central terminal 102 that the remote unit 130 failed to receive the particular message. In this case, the remote unit 130 waits 1224 for a predetermined time interval for the central terminal 102 to transmit at least the message data corresponding to the message that was missed over path A 152. If not received by the remote unit 130 within the predetermined time interval, then the remote unit 130 negatively acknowledges 1226 the central terminal 102, thereby requesting a re-transmission. Once the remote unit 130 receives 1224 at least the message data within the predetermined time interval, the remote unit 130 can then perform the message reception routine 1130, as shown in FIG. 11 and previously discussed. In this way, the remote unit 130 operates to receive at least the message data of previously missed messages that were identified through the reconciliation request.

Thus, the communication system 100 discussed above can provide the advantages of a high throughput and reliable delivery of messages between a central terminal 102 and one or more remote units 130. By utilizing a first communication medium, such as the paging communication channel, for the high throughput delivery of messages, and then utilizing a second communication medium, such as a more reliable dial-up telephone line interface between the central terminal 102 and the remote unit 130, the communication system 100 can effectively service large numbers of users, thereby making the communication system 100 commercially viable. At the same time, the reliability of message delivery approaches that of the direct wire line or dial-up telephone line interface Further, users are able to roam freely without being tied down to a specific geographic location, as limited by conventional wire line and dial-up telephone line communication systems. This is a significant advantage of the preferred embodiment of the present invention.

Furthermore, other communication techniques may be used by the communication system 100 to enhance reliability of delivering messages from the central terminal 102 to the one or more remote units 130. For example, a fade resistant coding scheme may be used in encoding the messages that are transmitted ever the paging channel. This technique can significantly reduce the probability that messages will be corrupted or missed by the receiving remote units 130 due to fading phenomena. A communication system providing fading resistant message coding, such as mentioned above, is more fully described in U.S. Pat. No. 4,914,649, issued Apr. 3, 1990, entitled "Multiple Frequency Message System", which is assigned to the same assignee as the present invention and is incorporated herein by reference.

Additionally, another technique for enhancing the reliability of delivering messages over the paging channel includes message compression. By reducing the total amount of time that a message requires for transmission over the paging channel, this reduces the probability that the message will be corrupted by noise, interference, fading, or other obstacles to communication. There are commercially available message compression algorithms that may be used at the central terminal 102 and at the remote units 130.

In an alternative embodiment of the present invention, the communication system 100 can deliver messages from the central terminal 102 to a plurality of remote units 130 without utilizing a message sequence number 208 in a message 200. Consequently, the central terminal 102 can simplify the data structure stored in memory 118 for each address of the plurality of remote units 130 in the communication system 100. Each address can have defined a portion of memory 118 for storing the messages that were transmitted to that address in the communication system 100. The messages do not have to be organized in memory 118 to represent a transmission sequence for the particular address, such as in a linked list structure. Of course, the central terminal 102 can optionally maintain message organization, e.g., the linked list, representing a transmission sequence. But it is not required, thereby allowing a simpler data structure to be maintained in memory 118.

Also, the message sequence number 208 is preferably not included in the message 200 that is transmitted to the one or more remote units 130. This reduces the transmission overhead for transmitted messages over the paging communication channel 122. Hence, it increases the overall channel throughput.

Furthermore, the remote unit 130 can store a simpler data structure in its memory 140, by not representing a transmission sequence with a data structure such as a linked list maintained in the memory 140. This allows simpler operation at the remove unit 130 because the transmission sequence information may not necessarily be maintained at the remote unit 130. Of course, if so desired, the remote unit 130 can maintain a data structure in memory to represent a transmission sequence, such as if the message sequence numbers Are included with the messages transmitted to the remote unit 130.

Finally, the message reconciliation process between the remote units 130 and the Central terminal 102 over path A 152 can also be simplified without including the message sequence numbers during message reconciliation communication over path A 152, as will be more fully discussed below. This can also enhance the overall throughput of delivering messages over path A 152. Therefore, in this alternative embodiment of the present invention which is more fully discussed below, the communication system 100 can deliver messages from the central terminal 102 to the ode or more remote units 130 without including the message sequence numbers 208, thereby providing a simpler message organization in the central terminal memory 118 and the remote unit memory 140, as well as reducing the overhead of information being transmitted for every message which can enhance the overall communication channel throughput (both over path A 152 and over path B 122).

Figure 13:
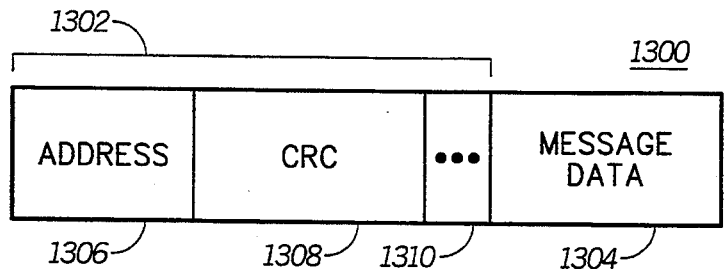
FIG. 13 is a message block diagram illustrating a transmitted message according to an alternative embodiment 15 of the present invention.

FIG. 13 is a message block diagram illustrating a transmitted message 1300 according to the alternative embodiment of the present invention. The central terminal 102 transmits the message 1300 to the one or more remote units 130 typically over the paging communication channel (path B) 122. The transmitted message 1300 typically includes identification and control information 1302, as well as message data information 1304. The message data 1304 normally is the information that is communicated between an originating party and the destination remote unit 130. That is, the message data 1304 is the message information communicated to the user of the selective call receiver 130. The message data 1304 can include numeric information, alphanumeric information, and binary data. The binary data is preferably word level compatible with computer systems, such as 8 bit ordinary data for personal computers.

The overhead information 1302 included with a message 1300 normally is required for delivering the message 1300 in the communication system 100. Such overhead information 1302 normally includes address information 1306 which identifies one or more remote units 130 as the destination of the associated message data 1304. Typically, when a remote unit 130 receives a message 1300 that was transmitted from the central terminal 102, the remote unit 130 can determine whether the particular message 1300 was intended for reception by the particular remote unit 130 by comparing the address information 1306 associated with the message 1300 to a predetermined address for the remote unit 130. A match between the address information 1306 and the predetermined address indicates that the particular remote unit 130 is the destination of the received message 1300.

A message identifier 1308 provides a means for identifying a message sent with the address information 1306 for reception by one or more remote communication receivers 130. The message identifier 1308 may comprise any identifying code, e.g., including any combination of numeric or non-numeric symbols, that can distinguish a message apart from other messages having the same address information 1306. This message identifier 1308 is useful where multiple messages are sent in the communication system 100 including one address information therewith, to allow the central terminal 102 and the remote units 130 to identify the multiple messages by the message identifiers included therewith.

Preferably, a CRC error detection code 1308 in the message 1300 provides a means for the remote unit 130 to determine when the received message data 1304 has been erroneously received, as discussed earlier, and, the CRC 1308 can also provide a means of identifying a received message 1300 for a particular address information 1306 because normally the CRC 1308 varies with the contents of the message data 1304. Both at the central terminal 102 and at the receiving remote units 130 the message 1300 can be stored along with the CRC 1308 for the particular address 1306 to help identify transmitted and received messages during the reconciliation process as will be more fully discussed below. Also, other identification and control information 1310, such as a message repetition count or even message sequence numbers, may be included in the message overhead 1302.

Normally when the central terminal 102 sends the message 1300 over the paging communication channel (path B) 122, the central terminal 102 stores a copy of the message. 1300 including the CRC 1308 is the memory 118. The central terminal 102 maintains a database in the memory 118 for keeping track of the messages sent to each address in the communication system 100. For example a database file in the memory 118 can group all the messages sent to an address (associated with one or more remote units 130) since the last time the central terminal 102 reconciled messages with the one or more remote units 130 associated with the address.

When the remote unit 130 receives the message 1300, the remote unit 130 stores at least the message data 1304 and the CRC 1308 of the message 1300 in the memory 140. The remote unit 130 keeps track of the received messages for each address, for example,i using a database in the memory 140. The CRC 1308 of the received message 1300 can 1304 to determine whether it was erroneously received. Optionally, when the remote unit determines that the message data 1304 was erroneously received the remote unit 130 can alert the user of the error condition. That is for example, when the message data 1304 is determined to be corrupted by the receiving remote unit 130, the remote unit 130 can automatically alert the user via a message on a visual display. The user can then couple the remote unit 130 to a telephone interface and utilize path A 152 communication with the central terminal 102 to request reconciliation of transmitted messages. In the reconciliation process the remote unit 130 can receive from the central terminal 102 at least the message data of the previously missed message, as further illustrated below.

Figure 14:
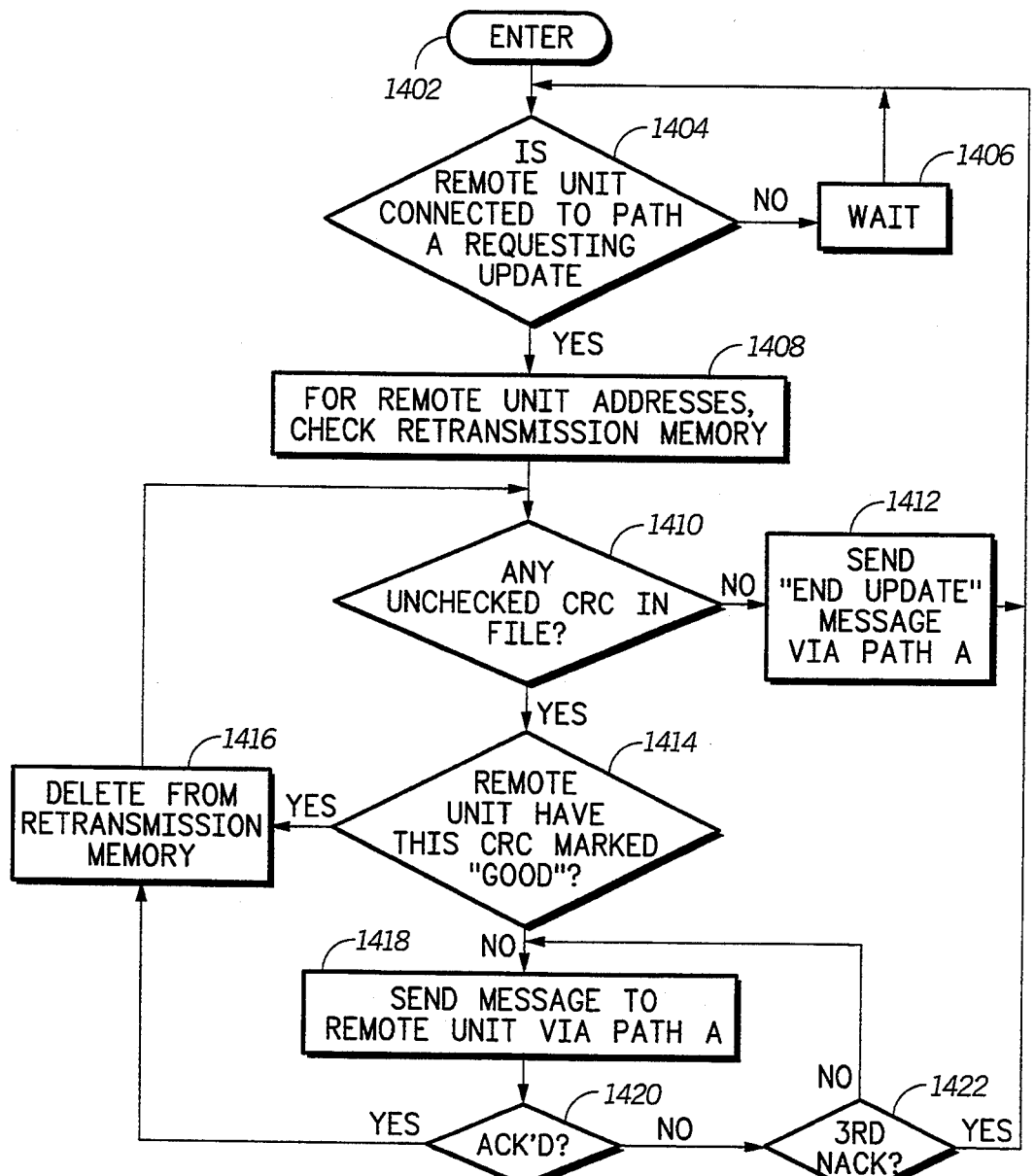
FIG. 14 is a flow diagram illustrating an operational sequence for the central terminal of FIG. 1, according to the alternative embodiment of the present invention.
Figure 15:
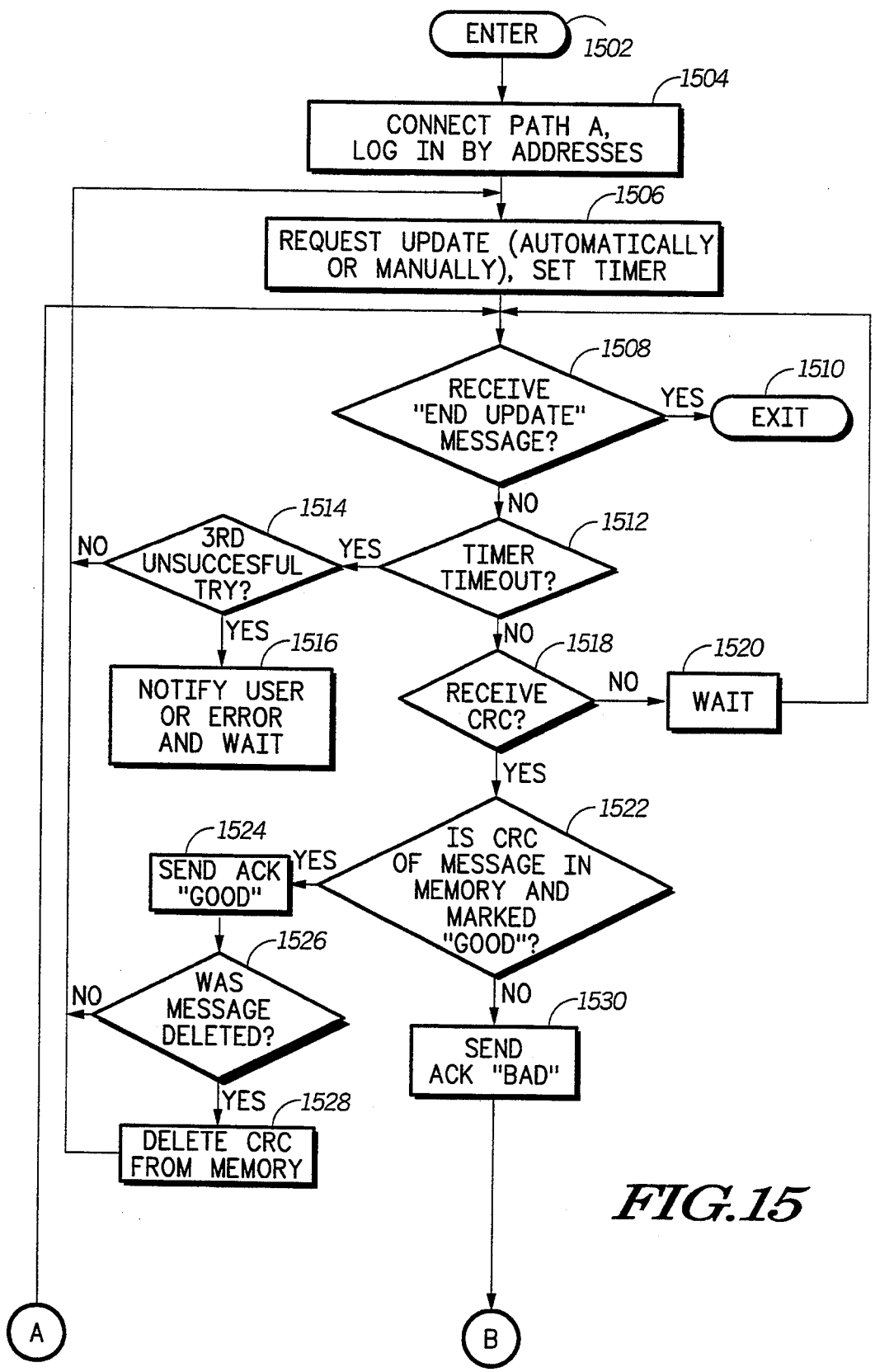
FIGS. 15 and 16 are flow diagrams illustrating an operational sequence for the remote unit of FIG. 1, according to the alternative embodiment of the present invention.

FIGS. 14 and 15 are flow diagrams illustrating operational sequences for the communication system 100, in accordance with the alternative embodiment of the present invention. FIG. 14 illustrates a reconciliation sequence for the central terminal 102, according to the alternative embodiment of the present invention. FIG. 15 illustrates a reconciliation sequence for the remote unit 130, according to the alternative embodiment of the present invention. The two operational sequences shown in FIGS. 14 and 15 may operate in a reconciliation process between the remote unit 130 and the central terminal 102 being coupled over the more reliable communication medium of path A 152, such as a dial up telephone line over the PSTN. The remote unit 130 can communicate through path A 152 with the central terminal 102 to initiate a reconciliation request and receive at least the message data 1304 of messages 1300 that were previously missed by the remote unit 130.

Referring to FIG. 14, while no reconciliation request is received 1402, 1404, by the central terminal 102, the central terminal 102 may wait 1406 for the reconciliation request and perform other system functions as necessary. When the central terminal 102 receives 1404 a reconciliation request from a remote unit 130 that is currently communicating with the central terminal 102 through path A 152, the central terminal 102 checks 1408 the database in the memory 118 associated with an address corresponding to the remote unit 130 for any previously transmitted messages. The address typically is identified in the reconciliation request. In the reconciliation operation, for example, the central terminal 102 can verify 1410, 1414 the messages stored in the database one at a time (identified by their CRC) with the remote unit 130 to determine whether there are any messages that were previously sent including the particular address of the database in memory 118 and that were not acknowledged as having been received by the remote unit 130.

Once the central terminal 102 determines 1408 that there are previously transmitted messages in the database in the memory 118, the central terminal 102 searches 1410 the messages in memory 118 that were transmitted to the remote unit 130 and not acknowledged by the remote unit 130 as having been received. Preferably, in the reconciliation request, the remote unit 130 identifies at least one address corresponding to the remote unit 130, and the central terminal 102 can then search 410 all messages that were transmitted to that address that are stored in the database in the memory 118. If there are 1410 no messages in the database that remain unacknowledged by the remote unit 130 then the central terminal 102 can send 1412 an "end of update" message through path A 152 to the remote unit 130, signaling the end of the reconciliation sequence for that address. On the other hand, if there are 1410 messages that were not acknowledged by the remote unit 130, then the central terminal 102 can identify each of these messages to the remote unit by sending the particular CRC of the message over path A 152 to the remote unit 130 and then verifying 1414 a response from the remote unit 130 identifying the reception status of the message corresponding to the particular CRC for the address.

If the remote unit 130 responds 1414 by acknowledging the message corresponding to tie particular CRC as being marked "good" then the central terminal 102 knows that the message was completely and correctly received by the remote unit 130 and then can delete 416 the message from the database in the memory 118. Subsequently, the central terminal 102 can process 1410 another message in the database. The central terminal 102 can send to the remote unit 130 through path A 152 the CRC of the next message being processed to verify 1414 whether the message was received by the remote unit 130.

If the remote unit 130 acknowledges 1414 the CRC of the message as having been marked "bad", e.g., indicating that the previously transmitted message was missed by the remote unit 130, then the central terminal 102 can send 1418 at least the message date 1304 to the remote unit 130 over path A 152. The central terminal 102 then waits 1420 for an acknowledgment from the remote unit 130. If the central terminal 102 receives a negative acknowledgment e.g., a NACK control message, from the remote unit 130 then the central terminal 102 will resend 1418 at least the message data 1304. But if the central terminal 102 has already resent to the remote Unit 130 for a predetermined number of times, e.g., for a third time 1422, it then may terminate the reconciliation session. Hence, the central terminal 102 can retransmit the at least message data 1304 to the remote unit 130 over the more reliable path A 152, for example, for up to three times. After the third try 1422 the central terminal 102 may discontinue the communication with the remote unit 130 and free up the interface to connect 1404 with other remote units 130.

When the message is acknowledged 1420 by the remote unit 130 the central terminal 102 can then delete 1416 the message from the database in the memory 118, and then process 1410 any other messages in the database that have not been acknowledged by the remote unit 130. This handshaking process between the central terminal 102 and the remote unit 130 can continue until all the messages in the database have been processed. In this way, the central terminal 102 can deliver at least the message data 1304 of messages 1300 to the remote unit 130 over the more reliable medium of the path A 152. Hence, if the remote unit 130 previously missed a message 1300 over path B 122, the remote unit 130 can subsequently reconcile with the central terminal 102 over path A 152 and reliably receive at least the message data 1304 of the previously missed messages 1300. When all messages have been processed, the central terminal 102 can send 1412 an "end of update" message over path A 152 to the remote unit 130 to end the reconciliation process.

Figure 16:
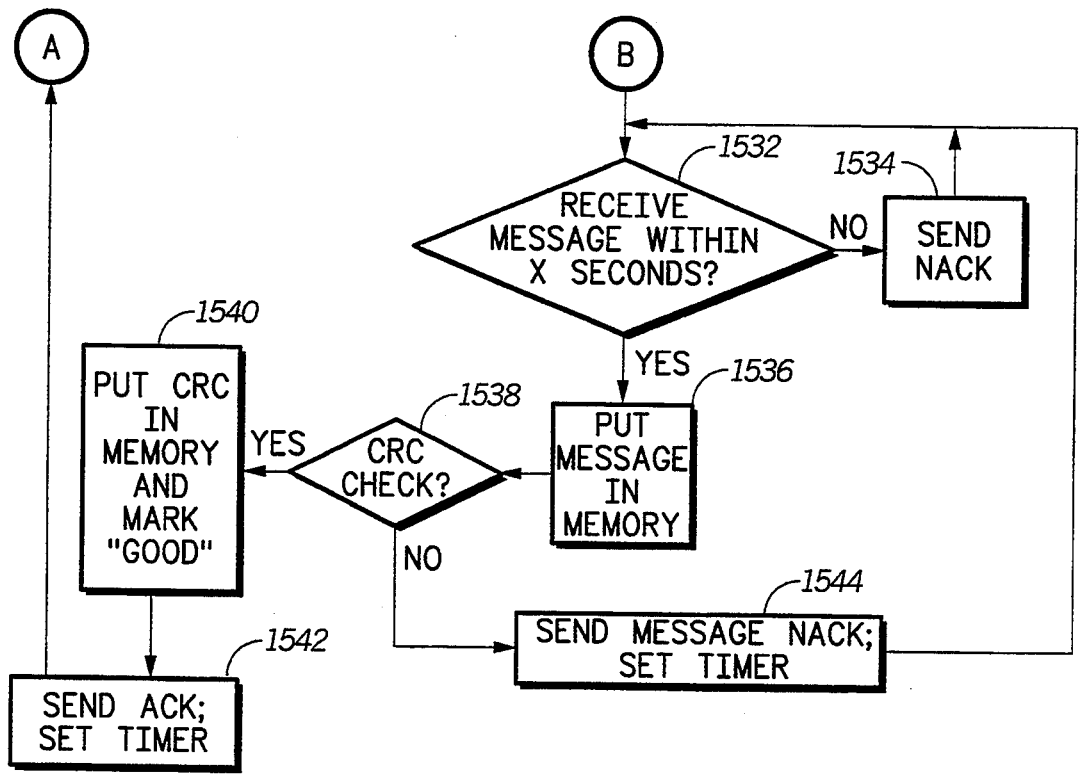

Referring to FIGS. 15 and 16, once the remote unit 130 is connected 1502, 1504 and communicating with the central terminal 102 over path A 152, the remote unit 130 can initiate a reconciliation sequence 1506 by sending a reconciliation request to the central terminal 102. This can be done automatically between the remote unit 130 and the central terminal 102, or, optionally, as a response to a manually entry, e.g., in response to user input, at the remote unit 130 by buttons or switches 141. While in the reconciliation sequence, if the remote unit 1130 receives a request from the central terminal 102 to terminate 1508 the reconciliation sequence, the remote unit 130 can exit 1510 and perform other functions as necessary. When the remote unit 130 initiates 1506 a reconciliation sequence, it can also set a timer to a predetermined value to provide a maximum time interval for the central terminal 102 to respond to the reconciliation request. While waiting for the response, if the timer times out 1512 then the remote unit 130 determines whether this was, for example, the third try 1514, and if not then it retransmits 1506 the reconciliation request over path A 152 and resets the timer. After a predetermined number of tries, e.g., after three tries 1514, the remote unit 130 may exit the reconciliation sequence and notify 1516 the user of an error condition and wait for an input. While waiting for the response from the central terminal 102, if the remote unit 130 receives 1518 a CRC from the central terminal 102 then it can process 152.2 the received CRC. Otherwise, the remote unit 130 continues to wait 1520 for the response from the central terminal 102.

Once the remote unit 130 receives 1518 the CRC from the central terminal 102, it verifies 1522 that the CRC is in memory 140 and marked "good". That is, if the CRC stored in the memory 140 is marked "good", then the message data 1304 associated with the CRC for the address was completely and correctly received by the remote unit 130. In this case, the remote unit 130 can send 1524 an acknowledgment to the central terminal 102 that the CRC corresponding to the message has marked "good".

Further, if the message Was already deleted 1526 from memory 140, such as when a user has already read and discarded the message, then the remote unit 130 can also delete 1528 the CRC from the Memory 140. Otherwise, if the message was not deleted 1526, the CRC remains stored in the memory 140. Subsequently, the remote unit 130 can initiate 1506 another reconciliation request with the central terminal 102 for another address.

If the CRC of a message is not in memory 140 and marked "good" 1522, then the remote unit 130 can send 1530 an acknowledgment to the central terminal 102 indicating that the CRC of the message is "bad". That is, the "bad" acknowledgment indicates that the message was previously missed by the remote unit 130.i In this case, the remote unit 130 monitors 1532 path A 152 for a predetermined time interval for receiving at least the message data 1304 of the message 1300 corresponding to the CRC 1308.

If at least the message data 1304 is not received 1532 within the predetermined time interval then the remote unit 130 can send 1534 a NACK message to the central terminal 102. The NACK prompts the central terminal 102 to resend at least the message data 1304 of the message 1300.

When the remote unit 130 receives 1532 at least the message data 1304 of the message 1300 it then stores 1536 at least the received message data 1304 of the message 1300 in the memory 140. Subsequently, the remote unit 130 can compare 1538 the computed CRC of the received message data 1304 to the received CRC value to determine if there were any errors in the received message data 1304. If the message data was erroneously received 1538, e.g., the computed CRC does not match the received CRC value, then the remote unit 130 sends 1544 a NACK message to the central terminal 102 and then resets the timer to wait the predetermined time interval for receiving 1332 at least a message data 1304. Optionally, the remote unit 130 may repeat this process 1532, 1536, 1538, 1544, for a predetermined number of tries, e.g., three tries, at which time the remote unit 130 may disconnect and terminate communications with the central terminal 102.

When the computed CRC matches 1538 the received CRC value, indicating that the message data 1304 was completely and correctly received by the remote unit 130, the remote unit 130 then stores 1540 the CRC in the memory 140 and marks it as "good". Further the remote unit 130 then sends 1542 an acknowledgment to the central terminal 102 acknowledging that the message data 1304 was completely and correctly received by the remote unit 130.

Then, the remote unit 130 resets 1542 the timer for the time interval to receive a response with a CRC from the central terminal 102 and waits 1520. In this way, the remote unit 130 handshakes reconciliation requests and acknowledgments with the central terminal 102 for delivering to the remote unit 130 at least the message data 1304 of messages 1300 that were previously missed by the remote unit 130. Communication over path A 152 can reliably deliver at least the message data 1304 of previously missed messages 1300 from the central terminal 102 to the remote unit 130.

Therefore, the alternative embodiments of the communication system 100 discussed above can provide the advantages of a high throughput and reliable delivery of messages between the central terminal 102 and the one or more remote units 130.

What is claimed is:

1. A method in a communication system for reliably delivering messages to at least one portable selective call receive from a communication controller the method comprising within the communication controller, the steps of:
   (a) storing messages comprising address cyclical redundancy codes (CRCs), and message data;
   (b) transmitting the messages over a first communication medium for reception by at least one portable selective call receiver, wherein the CRCs transmitted within the messages are unique according to corresponding message data and are used to identify the corresponding message data;
   (c) receiving a message reconciliation request from one portable selective call receiver of the at least one portable selective call receiver over a second communication medium, different than the first communication medium, the message reconciliation request identifying a predetermined address for the one portable selective call receiver;
   (d) reconciling stored messages with the one portable selective call receiver over the second communication medium using the CRCs to identify the transmitted messages to determine a reception status of the transmitted messages for the one portable selective call receiver; and
   (e) transmitting to the one portable selective call receiver, over the second communication medium, at least the message data of the transmitted messages having a reception status indicating that the one portable selective call receiver failed to receive the transmitted messages for reliably delivering messages to the at least one portable selective call receiver in the communication system.

2. The method of claim 1 wherein the first communication medium is a radio frequency paging channel.

3. The method of claim 1 wherein the second communication medium is a dial-up telephone line interface using modem communication, 4. The method of claim 1 wherein the second communication medium is a radio frequency communication channel, 5. The method of claim 1 wherein step (d) comprises the steps of:
   (f) handshaking the CRCs of the stored messages that include the address information matching the predetermined address to the one portable selective call receiver; and
   (g) receiving acknowledgment from the one portable selective call receiver indicating the reception status of the messages identified by the handshaking of the CRCs.

6. The method of claim 5, wherein the one portable selective call receiver performs the, steps of:
   (h) receiving the messages transmitted in step (b);
   (i) searching the received messages that included address information matching the predetermined address identified in the message reconciliation request for matching the handshaking CRCs to the CRCs of the searched messages;
   (j) after determining that there is no match between one of the CRCs handshaking in step (f) and the CRCs of the searched messages, transmitting the acknowledgment indicating a reception status that the one portable selective call receiver failed to receive a message corresponding to the one of the CRCs handshaking in step (f); add
   (k) receiving at least the message data of the message indicated as having been failed to received in step (j) over the second communication medium for reliably delivering messages to the at least one portable selective call receiver in the communication system.

7. The method of claim 5, wherein the one portable selective call receiver performs the steps of:
   (l) receiving the messages transmitted in step (b);
   (m) determining from a corresponding CRC that there is an error in one of the received messages;

(n) identifying the predetermined address in the message reconciliation request matching the address information of the one of the received messages;

(o) matching one of the CRCs handshaking in step (f) with the corresponding CRC of the one of the received messages;

(p) transmitting an acknowledgment in step (g) indicating a reception status that the one portable selective call receiver failed to receive the one of the received messages; and (q) receiving at least the message data of the one of the received messages indicated in step (p) over the second communication medium for reliably delivering messages to the at least one portable selective call receiver in the communication system.

8. The method of claim 7, wherein step (m) comprises the step of:

(r) determining error in one of the received messages by comparing the CRC of the one of the received messages to a computed value based on the content of the one of the received messages.

9. A method in a communication system for reliably delivering messages from a communication controller to at least one portable selective call receiver, the method comprising the steps of:

(a) storing messages at the communication controller, the messages comprising address information, cyclical redundancy codes (CRCs), and message data;

(b) transmitting the messages from the communication controller over a first communication medium for reception by at least one portable selective call receiver, wherein the CRCs transmitted within the messages are unique according to the corresponding message data and are used to identify the message data;

(c) receiving a message reconciliation request at the communication controller from the at least one portable selective call receiver over a second communication medium, different than the first communication medium, the message reconciliation request identifying a predetermined address for the portable selective call receiver;

(d) searching the messages stored at the communication controller for locating the messages that were transmitted which include address information matching the predetermined address identified in step (c);

(e) transmitting at least one of the CRCs of at least one of the messages found in step (d) from the communication controller to the at least one portable selective call receiver over the second communication medium;

(f) verifying at the at least one portable selective call receiver, in response to receiving the at least one of the CRCs at the portable selective call receiver, whether the portable selective call receiver failed to receive the at least one of the messages identified by the at least one of the CRCs, respectively;

(g) transmitting a reconciliation acknowledgment from the portable selective call receiver to the communication controller over the second communication medium to confirm a reception status of the at least one of the messages identified by the at least one of the CRCs verified in step (f) the reception status indicating that the portable selective call receiver failed to receive the at least one of the messages or that it correctly and completely received the at least one of the messages; and (h) transmitting at least the message data of the at least one of the messages identified by the at least one of the CRCs being acknowledged in the reconciliation acknowledgment from the communication controller to the portable selective call receiver over the second communication medium, the reconciliation acknowledgment confirming that the portable selective call receiver failed to receive the at least one of the messages identified by the at least one of the CRCs.

10. A communication system for reliably delivering messages to at least one communication receiver, the communication system comprising:

first memory means for storing messages destined for transmission to at least one communication receiver, the messages comprising address information, message data, and cyclical redundancy codes (CRCs) which are unique according to corresponding message data and are used to identify the corresponding message data;

first message transmitting means coupled to the memory means for transmitting the messages over a first communication medium for reception by the at least one communication receiver;

second message transmitting means coupled to the memory means for transmitting at least the message data of the messages over a second communication medium for reception by the at least one communication receiver, the second communication medium being different than the first communication medium;

retrieving means for retrieving messages stored in the first memory means; and message reconciliation request processing means coupled to the retrieving means and to the second message transmitting means for receiving a message reconciliation request from the at least one communication receiver over the second communication medium, and in response to the message reconciliation request:

determining that at least one message was not received by the at least one communication receiver over the first communication medium, retrieving at least the message data of the at least one message from the first memory means, least the message data of the at least one message being identified by the CRC of the at least one message, and transmitting the message data of the at least one message over the second communication medium for reception by the at least one communication receiver, for reliably delivering messages from the communication system to the at least one communication receiver over at least one of the first communication medium and the second communication medium; and the at least one communication receiver for communicating with the communication system over the first communication medium and the second communication medium.

11. The communication system of claim 10 wherein the second communication medium is a dial-up telephone line interface using modem communication.

12. The communication system of claim 10 wherein the second communication medium is a radio frequency communication channel.

* * * * *

UNITED STATES PATENT AND TRADEMARK OFFICE
CERTIFICATE OF CORRECTION

PATENT NO. : 5,396,537
DATED : March 7, 1995
INVENTOR(S) : Robert J. Schwendeman It is certified that error appears in the above-indentified patent and that said Letters Patent is hereby corrected as shown below:

Column 21, line 60, after call delete "receive" and insert
        --receiver--.

Column 21, line 60, after controller insert --,--.

Column 21, line 63, after address insert --information,--.

Column 22, line 29, after communication delete "," and insert --.--.

Column 22, line 57, after (f); delete "add" and insert --and--.

Column 23, line 66, after (f) insert --,--.

Column 24, line 45, after retrieving delete "at least".

Column 24, line 46, after means, delete "least".

Signed and Sealed this

Twenty-first Day of November, 1995

*Attest:*

BRUCE LEHMAN

*Attesting Officer*       *Commissioner of Patents and Trademarks*